March 29, 1938.  G. M. SPACHER  2,112,570
TESTING APPARATUS FOR INTERNAL COMBUSTION ENGINES
Filed Sept. 23, 1935
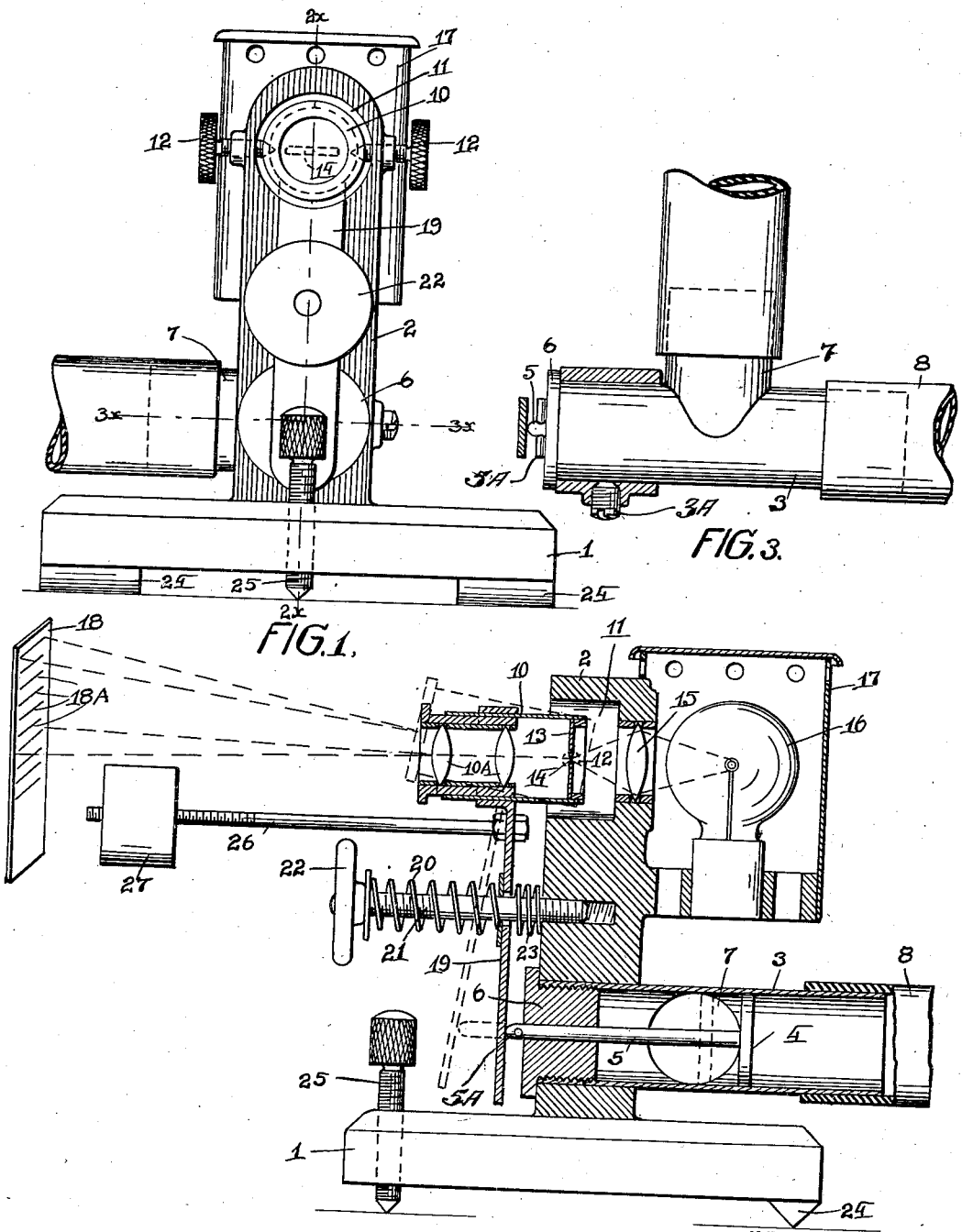
INVENTOR
GEORGE M. SPACHER
BY
ATTORNEY Patented Mar. 29, 1938

2,112,570

UNITED STATES PATENT OFFICE 2,112,570

TESTING APPARATUS FOR INTERNAL COMBUSTION ENGINES

George M. Spacher, Rochester, N. Y.

Application September 23, 1935, Serial No. 41,713

4 Claims. (Cl. 73—51)

This invention relates to testing apparatus for testing internal combustion engines and has for one of its objects to provide a novel testing apparatus which will accurately indicate the rate of flow and regularity of the exhaust gas impulses of an engine.

Another object of this invention is to provide the testing apparatus with optical indicating means so that the indications can be visually observed during the test.

A further object of this invention is to provide the testing apparatus with an optical indicator which will give the indications with optical precision.

All these and other objects and attendant advantages of the invention will become more clearly apparent from the detailed description of one embodiment thereof which follows, reference being had to the accompanying drawing in which Figure 1 is a front elevation of my testing apparatus.

Figure 2 is a vertical longitudinal sectional view thereof, the section being taken on the line 2x—2x of Figure 1.

Figure 3 is a horizontal sectional view taken on the line 3x—3x of Figure 1.

In the several figures of the drawing like reference numerals indicate like parts.

The testing apparatus forming the subject matter of my present invention is adapted for use in testing the rate of flow and regularity of the exhaust gas impulses of any internal combustion engine for the purpose of determining the operating efficiency of the engine in general and that of its individual operating members including the ignition system thereof.

As illustrated in the drawing the apparatus comprises a suitable base 1 which supports a standard 2 on which the testing and indicating mechanism is mounted. The testing mechanism comprises the cylinder 3 which is telescopically mounted in a horizontal position in the lower portion of the standard 2 and is held in place therein by means of the set screw 3A so as to project thru it and rearwardly thereof. In the cylinder is mounted the piston 4 which is supported by its piston rod 5 in a bearing in the head 6 in which the rod is mounted to slide. The head 6 closes the forward end of the cylinder 3 and the piston rod 5 projects thru it to operate the indicating mechanism which will presently be described. A cross pin 5A carried by the piston rod 5 on the outside of the head 6 serves to limit the movement of the piston rod in one direction. Leading laterally from the cylinder 3 is the outlet 7 which, with the piston 4 in its normal position in the cylinder, is located directly behind the piston so as to prevent the passage of gases from the cylinder into the outlet without displacing the piston. A suitable connection, such as for example a flexible tube 8, connects the open rear end of the cylinder with the exhaust pipe of the engine to be tested in order that all of the exhaust gases are forced thru the cylinder to operate the piston therein.

The indicating mechanism is mounted in the upper portion of the standard 2 and comprises the projector tube 10 which is mounted to oscillate in the horizontal opening 11 of the standard. For this purpose the bearing screws 12, 12 are threaded into the standard to engage suitable trunnion bearings in the side of the projector tube in order to centrally and pivotally support the tube in the opening 11 and provide for its limited oscillation in a vertical plane therein.

In the projector tube is mounted the diaphragm 13 and in this diaphragm is provided a light aperture in the form of a horizontal light slit 14. A condenser lens 15 is fixedly mounted in the rear of the opening 11 so as to focus the light from the filament of the glow lamp 16 into the slit 14. The glow lamp is mounted in a suitable housing 17 at the rear of the standard 2 to provide a fixed light source for the projection of a beam of light focused in the slit 14. The slit 14 is located in line with the axis of oscillation of the projector tube so that the light from the glow lamp remains focused in the slit at any angular position of the projector tube. The projector tube has the projecting lenses 10A, 10A adjustably mounted therein so that light from the slit is sharply focused onto the screen 18 in the form of a narrow beam which is parallel to and moves up and down on the indications 18A provided thereon on the oscillation of the projector tube.

The projector tube is operated by the arm 19 which is suitably attached thereto and extends in front of the end of the piston rod 5. The arm is yieldingly held against the end of the piston rod by means of the spring 20 which surrounds the stem 21 and is forced against the arm by means of the handle 22 which is threaded on the stem so as to provide for an adjustment of the spring to increase or decrease its resistance against the movement of the arm 19. A second spring 23 surrounds the stem 21 behind the arm 19 and serves to cushion the return movement of the arm 19.

For the purpose of initially setting the apparatus so as to have its light beam project on the zero indication 18A, the base is supported at the rear by a pair of fixed lugs 24 and at the front by the adjusting screw 25 which, when threaded in and out of the base, will raise and lower the front of the apparatus to tilt it into an initial position in which the light beam is projected onto the zero or starting indication provided on the screen. The movement of the beam on the operation of the testing apparatus will then indicate a movement on the screen which corresponds to the movement of the piston of the apparatus and is accurately calibrated by the indications 18A on the screen.

For the peak engine efficiency the rate of flow and the regularity of the exhaust gas impulses are noted by the range of movement of the light beam. If the movement of the light beam, as indicated on the screen, falls short of the standard movement for an engine of the same power rating, it shows that the engine is not operating efficiently. The trouble may then be located by observing the light beam while various adjustments, as for example that of the carburetor, are made on the engine. If the trouble is in the faulty setting of the carburetor the adjustment of it will make the light beam give the proper indication as soon as the proper setting of the carburetor has been reached.

In the case of a multicylinder engine a faulty compression in one or more cylinders can be detected by shortening the spark plugs of all but one of the cylinders at a time and noting the movement of the light beam produced by the operation of each cylinder and comparing this movement with the standard movement that each cylinder should produce. This may be caused by sticky, leaky or improperly adjusted valves and corrected accordingly.

In testing for skipping and unevenness of the engine explosions the engine is operated at various speeds and the movement of the light beam caused by the cylinders noted at the various speeds.

Wear of the cylinders, the pistons and piston rings and collapsed piston rings may be the cause of improper readings when testing the rate of flow and the regularity of the exhaust gas impulses. Air leaks in the intake may be found to cause inefficient operation of the engine if the carburetor adjustment will not remedy the trouble when observing the movement of the light beam.

In testing the electric circuits of the engine the performance of the engine, as given by the movement of the light beam, is observed when the various electric units, such as the ignition coil and its condenser, are replaced by standard units.

The primary circuit may be tested by attaching a standard battery to the post of the ignition coil and grounding it to the frame so as to eliminate the primary wiring and the original battery and comparing the performance of the engine with the new battery with the performance of the engine with the old battery and its primary circuit.

Defective spark plugs will affect the operation of the testing apparatus and may be checked by means thereof.

Faulty timing of the distributor, defective and worn ignition points, worn ignition cam, rotor, distributor cap and secondary wiring will also quickly show up in the operation of the testing apparatus.

A comparison of the operation of the engine at various speeds with a new air filter or without a filter will show up whether or not the old air filter prevented the efficient operation of the engine.

Of course the testing apparatus shown and described may be changed in various ways, and variations may be required under certain conditions. Therefore, while some of the constructional details are deemed preferable and I have shown and described them specifically, it is understood that I do not limit myself to such precise construction, but consider that I am at liberty to make such changes and alterations as fairly come within the scope of the appended claims.

I claim:

1. The combination in an indicating apparatus of a base, a standard on said base, a cylinder carried at one end by said standard, a head closing the end of said cylinder mounted in said standard, a piston rod mounted to slide in said head, a piston carried by said piston rod within said cylinder, an inlet in the other end of said cylinder and an outlet in the wall of said cylinder, said piston normally being between said inlet and outlet whereby the piston will be displaced in said cylinder on the passage of gases from the inlet thru its outlet, an arm mounted to swing on said standard, spring means for holding said arm against said piston rod and stop means carried by said piston rod whereby said spring means will normally hold said piston in a predetermined position in said cylinder from which it is displaced by the rate of flow of the exhaust gases leaving said cylinder thru its outlet to cause said arm to swing in an arc in accordance with the regularity of the impulses and the rate of flow of the exhaust gases which cause the movement of the piston, and an indicator carried by said arm.

2. The combination in an indicating apparatus as set forth in claim 1 including means for increasing and decreasing the pressure of said spring means against said swinging arm.

3. The combination in an indicating apparatus as set forth in claim 1 including means for angularly adjusting said base in a plane parallel to the plane of movement of said arm.

4. The combination in an indicating apparatus for internal combustion engines of a standard, a cylinder carried by said standard, a head closing one end of said cylinder, a piston within said cylinder, an inlet in the other end of said cylinder and an outlet in the wall of said cylinder, said piston normally being between said inlet and outlet whereby the piston will be displaced in said cylinder on the passage of gases from the inlet to the outlet, an arm mounted to swing on said standard, spring means for normally holding said piston in a predetermined position in said cylinder from which it is displaced by the rate of flow of the exhaust gases leaving said cylinder thru its outlet, and connecting means between said arm and said piston to cause said arm to swing in an arc in accordance with the regularity of impulses and the rate of flow of the exhaust gases which cause the movement of the piston, and indicator operated by said arm and means for increasing and decreasing the pressure of said spring means to vary the movement of said indicator by said arm.

GEORGE M. SPACHER.